Patented Oct. 1, 1946

2,408,475

UNITED STATES PATENT OFFICE 2,408,475

FLUORESCENT ZINC OXIDE

Clifford A. Nickle, Schenectady, N. Y., assignor to General Electric Company, a corporation of New York No Drawing. Application July 18, 1941, Serial No. 403,067

2 Claims. (Cl. 252—301.6)

The present invention comprises a new phosphor, which consists essentially of zinc oxide which has been heat-treated under specially controlled conditions adapted to develop fluorescent properties.

It has been reported heretofore that zinc oxide has fluorescent properties. However, when zinc oxide either with or without an addition of a material alleged to function as an activator has been heat-treated in accordance with the technique ordinarily employed for the preparation of fluorescent materials, only an insignificant fluorescence too faint for practical purposes has been obtainable. I have discovered that fluorescent properties may be induced by suitable heat treatment in the presence of a reducing gas followed by rapid cooling of the product, as will be hereinafter more fully described.

One of the advantageous properties of a phosphor made in accordance with my invention is its fluorescent responsiveness to excitation by ultraviolet radiation in the so-called "near ultraviolet" region, that is, the ultra-violet having a wave length within the range of about 3000 to 4000 A. units. It is particularly responsive to excitation by ultraviolet of 3650 A. The new zinc oxide matrix phosphors made in accordance with my invention, while being susceptible to excitation to shorter wave length ultraviolet, such as the 2537 A. ultraviolet emitted by an electric discharge through low pressure mercury vapor, are less markedly responsive to the far ultraviolet than to the longer wave length or near ultraviolet. They may be excited by cathode rays, as in television-receiving tubes, with good fluorescent efficiency.

For the preparation of such phosphors I employ preferably an activator consisting of about one per cent of a suitable bismuth compound, such as bismuth sulphate, bismuth oxide, or bismuth nitrate, or even metallic bismuth. Other activators, for example sodium sulphate, sodium chloride, or manganese dioxide may be used. In some cases natural impurities present in zinc oxide will serve as activators. Zinc dust added to the zinc oxide has an activating effect.

The zinc oxide and activator are heated in a suitable furnace to a temperature of about 1000° C. in the presence of a reducing gas, such as hydrogen. During the heat treatment step, which requires only a few minutes, the exact time depending somewhat on the size of the reaction mixture, movement or flow of the hydrogen should be kept as low as possible. For small batches of one to several ounces, the heat treatment required is about 3 to 5 minutes. After such heat treatment in reducing gas the phosphor mixture is removed from the furnace and cooled rapidly in the open air. The cooling advantageously may be speeded up by rapidly breaking up the product which naturally retains its pulverulent form. Even when loosely coherent it is easily disintegrated into a powder. The heat treatment in reducing gas produces some molecular change in the zinc oxide, not known to me, which results in the fluorescent responsiveness to ultraviolet and cathode rays.

The hydrogen-treated zinc oxide phosphor can be readily suspended in liquids, such as cellulose lacquers to prepare paints which are responsive to ultraviolet. The phosphors made in accordance with my invention are far cheaper and more permanent and are more easily suspended in suitable paint vehicles than other phosphors which heretofore have been used for the preparation of fluorescent paints.

When excited by unltraviolet or cathode rays, the heat-treated zinc oxide phosphor made as above described emits at high efficiency substantially white light of slightly greenish tint. The spectrum is continuous, all the visible wave lengths being present.

What I claim as new and desire to secure by Letters Patent of the United States, is:

1. A phosphor comprising zinc oxide and an activator of bismuth sulphate, the fluorescent-responsiveness of which has been induced by heat treatment in the presence of hydrogen.

2. A phosphor consisting essentially of a zinc oxide matrix with substantially one per cent of bismuth in activating relation to said matrix, whereby the same is rendered excitable to fluorescence, and further characterized by a marked white-light fluorescence, in response to long-wave ultraviolet and cathode rays, which has been induced by heat treatment in hydrogen at substantially 1000° C. followed by rapid cooling in the open air, as contrasted with only an insignificant, faint fluorescence arising from heat treatment without reducing influence.

CLIFFORD A. NICKLE.